Patented Dec. 29, 1953

2,664,426

UNITED STATES PATENT OFFICE 2,664,426

ADDUCTS OF THIANAPHTHENE-1-1-DIOXIDE

Otto C. Elmer, Fishkill, N. Y., assignor to The Texas Company, New York, N. Y., a corporation of Delaware No Drawing. Application March 4, 1950,
Serial No. 147,763

6 Claims. (Cl. 260—330.5)

This invention relates to a new class of chemical compounds and to a process for preparing them. More particularly it relates to the reaction of conjugated dienes with thianaphthene 1,1-dioxide and compounds thereof.

I have found that a series of valuable compounds can be made by reacting thianaphthene 1,1-dioxide or a substituted derivative thereof with certain conjugated dienes under conditions such that a condensation of the Diels Alder type occurs. Compounds are produced by this reaction having the general formula

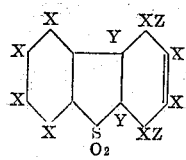

wherein X stands for hydrogen, a halogen or a hydrocarbon radical such as an alkyl or aryl group, Y stands for hydrogen, a carboxy or carbalkoxy group and Z stands for hydrogen, a halogen, a hydrocarbon radical such as an alkyl or aryl group, a methylene group, a polymethylene group, or substituted methylene and polymethylene groups. A bridge structure comprising a methylene or polymethylene group results when the diene reactant is a cyclic compound comprising five or more carbon atoms in the ring.

Thianaphthene 1,1-dioxide compounds which may be reacted according to this process may be substituted on the benzene ring by substituents such as halogens or organic radicals. Either or both of the hydrogens attached to the cyclic sulfone group may be replaced by substituents if these do not interfere with the condensation reaction. Such substituents are most suitably certain groups which tend to increase the activity of the double bond in the diene synthesis, such as the carboxy group.

Dienes suitable for use in this reaction are aliphatic or cyclic hydrocarbons containing at least two double bonds in the conjugated position, and certain derivatives of such compounds containing substituents such as halogens or organic radicals. In general any compound which readily undergoes the Diels Alder condensation with maleic anhydride or vinyl acetate will react according to the process of my invention.

The simplest member of the aliphatic series of conjugated dienes capable of undergoing this reaction is 1,3-butadiene. This compound reacts readily with thianaphthene 1,1-dioxide according to the following equation

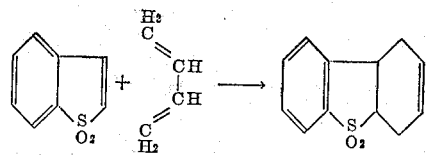

Homologs and derivatives of 1,3 butadiene which also undergo this reaction include isoprene, chloroprene, bromoprene, 2,3-dimethyl-1,3 - butadiene, 1,3 - pentadiene, 2 - methyl-1,3-pentadiene, 1,3-hexadiene, 1,3,5-hexatriene, 6-phenyl-1,3-hexadiene and conjugated unsaturated acids such as linoleic and linolenic acids.

When an unsaturated compound containing more than two double bonds in the conjugated position, such as 1,3,5 hexatriene is employed, the addition still takes place on the 1,4 positions relative to a conjugated diene group so as to form a six membered ring as shown in the above equation.

Certain cyclic hydrocarbons containing conjugated double bonds and their derivatives also react with thianaphthene 1,1-dioxide to form a condensation product according to the process of my invention. Cyclic diolefins which react in this manner include 1,3-cyclopentadiene, 1,3-cyclohexadiene and 1,3-cycloheptadiene. The reaction of a cyclic hydrocarbon results in the formation of a six membered ring having a bridge of one or more carbon atoms depending upon the number of carbon atoms in the diene ring. For example, when the diene reactant is 1,3-cyclopentadiene, the reaction product contains an endo-methylene group, and when 1,3-cyclohexadiene is reacted an endo-ethylene group is formed.

Of the cyclic hydrocarbons which undergo this reaction with thianaphthene 1,1-dioxide, 1,3 cyclopentadiene reacts the most readily to give the condensation product desired. The fully chlorinated derivative of this compound, hexachlorocyclopentadiene, also reacts readily to give a compound having the formula

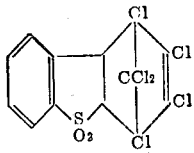

This highly chlorinated polycyclic sulfone and its derivatives have properties which make them particularly valuable for use as insecticides, lubricant additives and chemical intermediates with the result that these compounds comprise a preferred embodiment of my invention.

The reaction may be carried out in liquid phase or by the fusion method whereby the two reactants are melted together at a temperature not substantially higher than their melting points. The reaction may be carried out in a suitable solvent such as benzene or a high boiling liquid such as toluene, xylene, o-dichlorobenzene or nitrobenzene. The temperature at which the reaction is carried out will vary with the diene compound being reacted. In general reaction temperatures will range between about 80° and 300° C. Compounds may be added which serve to inhibit polymerization of the diene, such as hydroquinone or pyrogallol. The use of such inhibitors is particularly desirable with dienes which have a strong tendency to polymerize. The following examples illustrate my invention by means of the reaction between thianaphthene 1,1-dioxide and 1,3-butadiene in Example 1, and between thianaphthene 1,1-dioxide and hexachlorocyclopentadiene in Example 2.

Example 1

16.6 g. of thianaphthene-1,1-dioxide and 50 cc. of toluene containing a small amount of phloroglucinol were charged to an autoclave, and 27 g. of butadiene added to the solution. The resulting reaction mixture was heated at 300° F. and 100 lbs. pressure for 7 hours. It was then cooled to room temperature and permitted to stand for 48 hours, and the solid reaction product recovered by boiling off the toluene. Recrystallization of the crude reaction product from 95% ethyl alcohol yielded 7.5 g. of a crystalline compound having a melting point of 90.4–91.3° C., to which was assigned the following formula:

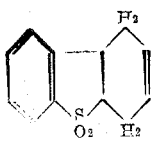

Analysis of this product indicated that it contained 65.30% carbon, 5.58% hydrogen and 14.30% sulfur, as compared with calculated theoretical values of 65.42%, 5.49% and 14.56% for the elements in the order named.

Example 2

16.5 g. of thianaphthene 1,1-dioxide, 80 cc. of xylene containing a small amount of pyrogallic acid and 30 g. of hexachlorocyclopentadiene were combined in a 3 inch pyrex flask fitted with a stirrer, reflux condenser and thermometer. This reaction mixture was heated until a temperature of 145° C. was reached, and then refluxed for five hours at this temperature. It was then cooled to room temperature and permitted to stand until the crystalline reaction product had separated out. Recrystallization of the crude reaction product from 95% ethyl alcohol yielded a crystalline compound having a melting point of 186–187° C. to which was assigned the following formula:

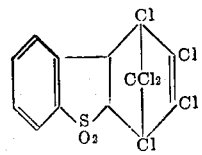

Analysis of this product showed that it contained 35.59% carbon, 1.38% hydrogen, 7.30% sulfur and 48.46% chlorine, as compared with calculated theoretical values of 35.56%, 1.37%, 7.30% and 48.46% for the elements in the order named.

While the examples given above may be taken as illustrative of the preferred method for carrying out the process of my invention, they are not to be construed as limiting the invention in any way, as other methods of preparation may be used. For example, satisfactory results were also obtained in the reaction between thianaphthene 1,1-dioxide and hexachlorocyclopentadiene by heating the reactants together at 300° C. and 35 lbs. pressure in the absence of a solvent and of a polymerization inhibitor.

The compounds obtained by my process may be useful per se for various commercial purposes, or they may be reacted further to convert them into more valuable compounds by treatments such as hydrogenation, halogenation, heating to remove endo groups, and so forth.

Obviously, many modifications and variations of the invention, as hereinbefore set forth, may be made without departing from the spirit and scope thereof, and therefore, only such limitations should be imposed as are indicated in the appended claims.

I claim:

1. A novel adduct of thianaphthene-1,1-dioxide and a conjugated diene having the general formula

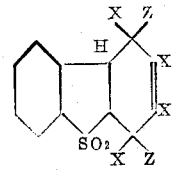

wherein X is selected from the group consisting of hydrogen, chlorine, bromine, methyl and ethyl radicals, and Z is selected from the group consisting of hydrogen, chlorine, bromine, a methyl radical, an ethyl radical, an endomethylene group, an endopolymethylene group and a chloro substituted methyleneendo group.

2. A compound having the formula

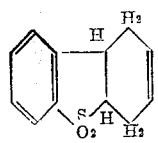

3. A compound having the formula

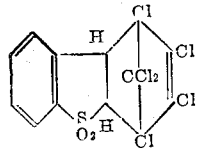

4. A process for preparing thianaphthene-1,1-dioxide condensation products which comprises heating at elevated temperature thianaphthene-1,1-dioxide with a conjugated diene selected from the group consisting of acyclic diolefins, halo-substituted acyclic diolefins, phenyl-substituted acyclic diolefins, monocarboxy-substituted acyclic diolefins, cyclic diolefins containing 5 to 7 carbon atoms and chloro-substituted cyclic diolefins containing 5 to 7 carbon atoms.

5. A process for preparing a thianaphthene-1,1-dioxide condensation product which comprises heating at elevated temperature butadiene with thianaphthene 1,1-dioxide.

6. A process for preparing a thianaphthene-1,1-dioxide condensation product which comprises heating at elevated temperature hexachlorocyclopentadiene with thianaphthene 1,1-dioxide.

OTTO C. ELMER.

References Cited in the file of this patent

UNITED STATES PATENTS

| Number | Name | Date |
|---|---|---|
| 2,401,099 | Peterson | May 28, 1946 |

OTHER REFERENCES

Alder et al. Ber. 71, 2451–61 (1938).